United States Patent Office 3,280,148
Patented Oct. 18, 1966

3,280,148
SUBSTITUTED DIOXEPINS
Chester E. Pawloski, Bay City, Mich., and George B. Sterling, Mogadore, Ohio, assignors to The Dow Chemical Company, Midland, Mich., a corporation of Delaware
No Drawing. Filed Dec. 11, 1963, Ser. No. 329,855
3 Claims. (Cl. 260—338)

This invention relates to substituted dioxepins, and more particularly is concerned with novel 2,2'-hydrocarbon-substituted bis(4,7-dihydro-1,3-dioxepins).

The compounds of the present invention may be represented by the formula

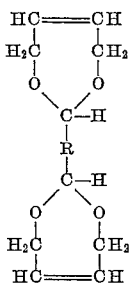

wherein R represents phenylene or a lower alkylene radical having 1 to 4 carbon atoms, e.g., methylene, ethylene, propylene or butylene.

The compounds of the present invention may be made by reacting cis-2-butene-1,4-diol with a dialdehyde alone or in the presence of a dialkoxy alkane; by reacting cis-2-butene-1,4-diol with a diketone alone or in the presence of a dialkoxy alkane; by reacting cis-2-butene-1,4-diol with a tetra alkoxy alkane prepared from a dialdehyde or diketone; or by reacting cis-2-butene-1,4-diol with a dialkoxy carbonyl alkane prepared from a dialdehyde or diketone.

The novel compounds of this invention are useful as chain transfer agents in the polymerization of vinyl monomers. They are also useful as monomers copolymerizable with vinyl monomers. They are further useful in the selective control of the growth of aquatic weeds such as algae of the genus Chlorella and for inhibiting the corrosion of metals, particularly aluminum, by chlorinated hydrocarbons such as methyl chloroform.

The invention is further illustrated by the following examples:

Example 1

Preparation of 2,2'-methylene bis(4,7-dihydro-1,3-dioxepin)—

Charge:                                               Mole
164 gms. 1,1,3,3-tetramethoxypropane _____ 1
88 gms. cis-2-butene-1,4-diol _____ 1
Few drops conc. sulfuric acid.

Procedure: The reactants were placed into a one liter flask and mixed. A single liquid phase was obtained from two with a noted drop in temperature. The mixture was then distilled over a thirty inch glass column at 3/1 reflux ratio and one atmosphere of pressure until the pot temperature reached 115° C. The reaction was then allowed to cool to room temperature. Some solid sodium carbonate was added and the distillation continued under vacuum. The distillation cuts were analyzed by infrared spectroscopy. A 92 percent yield of 2,2'-methylene bis-4,7-dihydro-1,3-dioxepin was obtained. B.P. 100° C. at 1.8 mm. Hg M.P. 58–59° C.

Example 2

Preparation of 2,2'-p-phenylene bis(4,7-dihydro-1,3-dioxepin)—

Charge:                                                 Mole
34 gms. terephthaldehyde _____ ¼
44 gms. cis-2-butene-1,4-diol _____ ½
200 mls. benzene.
Few drops conc. sulfuric acid.

Procedure: The reactants were placed into a one liter flask equipped with an azeotropic column and heated to reflux until the theoretical amount of water was removed. Some solid sodium carbonate was added and the product recrystallized from benzene. The product was a white solid. M.P. 134–136° C.

In a manner similar to that of Example 1, 2,2,'-ethylene bis(4,7-dihydro-1,3-dioxepin) is prepared by reacting cis-2-butene-1,4-diol with 1,1,4,4-tetramethoxybutane; 2,2'-propylene bis(4,7-dihydro-1,3-dioxepin) is prepared by reacting cis-2-butene-1,4-diol with 1,1,5,5-tetramethoxypentane; and 2,2'-butylene bis(4,7-dihydro-1,3-dioxepin) is prepared by reacting cis-2-butene-1,4-diol with 1,1,6,6-tetramethoxyhexane, or the corresponding dialdehydes and dialkoxyketones with or without the presence of a dialkoxyalkane.

The use of the compounds of this invention as chain transfer agents is illustrated by the following example:

Example 3

Procedure: Twenty-five gram charges of various percentages of styrene and 2,2'-methylene bis(4,7-dihydro-1,3-dioxepin) and styrene and 2,2'-p-phenylene bis(4,7-dihydro-1,3-dioxepin) were placed into 2 ozs. bottles with 0.1 percent benzoyl peroxide as catalyst. The samples were placed into an air oven and heated at 80° C. for 24 hours. The heat was raised to 110° C. and the samples heated until they were solid and clear. The samples were removed from the bottles and made into a 5 percent solution of polymer in toluene for viscosity checks. The following results were obtained:

| Samples: | Viscosity in cps. at 25° C. |
|---|---|
| 100 percent styrene polymer in solution | 41.7 |
| 99.95 percent styrene .05 percent 1,3-dioxepin: 2,2'-p-phenylene bis(4,7-dihydro) | 27.75 |
| 99.8 percent styrene .2 percent above dioxepin | 24.80 |
| 99.5 percent styrene .5 percent above dioxepin | 20.23 |
| 98.0 percent styrene 2.0 percent above dioxepin | 16.56 |
| 95.0 percent styrene 5.0 percent above dioxepin | 10.24 |
| 99.95 percent styrene .05 percent 1,3-dioxepin: 2,2'-methylene bis(4,7-dihydro) | 21.96 |
| 99.8 percent styrene .2 percent above dioxepin | 22.37 |
| 99.0 percent styrene 1.0 percent above dioxepin | 17.12 |
| 98.0 percent styrene 2.0 percent above dioxepin | 12.27 |
| 95.0 percent styrene 5.0 percent above dioxepin | 7.298 |

Various modifications may be made in the present invention without departing from the spirit or scope thereof and it is understood that we limit ourselves only as defined in the appended claims.

We claim:
1. Compounds having the formula
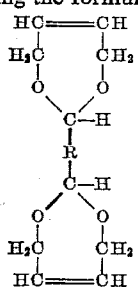
wherein R represents p-phenylene, methylene, ethylene, propylene or butylene.
2. 2,2'-methylene bis(4,7-dihydro-1,3-dioxepin).
3. 1,4-bis(4,7-dihydro-1,3-dioxepin-2-yl)benzene.
No references cited.
WALTER A. MODANCE, *Primary Examiner.*
NORMA S. MILESTONE, *Assistant Examiner.*